United States Patent
Nagamune

(10) Patent No.: US 7,486,066 B2
(45) Date of Patent: Feb. 3, 2009

(54) TRANSFORMER, MULTI-OUTPUT SWITCHING POWER SUPPLY, LIQUID CRYSTAL TELEVISION

(75) Inventor: Atsuhiko Nagamune, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 231 days.

(21) Appl. No.: 11/497,777

(22) Filed: Aug. 2, 2006

(65) Prior Publication Data

US 2007/0030404 A1 Feb. 8, 2007

(30) Foreign Application Priority Data

Aug. 2, 2005 (JP) .............................. 2005-224380

(51) Int. Cl.
*H02J 1/00* (2006.01)
(52) U.S. Cl. ..................... 323/346; 336/174; 336/84 R; 363/21.02
(58) Field of Classification Search .............. 363/21.04, 363/21.07, 21.12, 21.16, 21.18, 19, 23, 26, 363/79, 97, 21.02; 336/69, 84 R, 84 C, 182, 336/185, 411, 232, 225, 174; 315/204, 207, 315/224, 246, 291; 307/327, 66, 64; 323/346, 323/357, 358
See application file for complete search history.

(56) References Cited

U.S. PATENT DOCUMENTS 4,658,342 A * 4/1987 Wharton .................. 363/21.04

5,502,430 A * 3/1996 Takahashi et al. ........... 336/232

FOREIGN PATENT DOCUMENTS

| JP | 10-327581 | 12/1998 |
|---|---|---|
| JP | 2000-184714 | 6/2000 |
| JP | 2003-153530 | 5/2003 |

OTHER PUBLICATIONS

Patent Abstracts of Japan, Publication No. 2003-153530, Publication Date: May 23, 2003, 1 page.
Patent Abstracts of Japan, Publication No. 10-327581, Publication Date: Dec. 8, 1998, 2 pages.
Patent Abstracts of Japan, Publication No. 2000-184714, Publication Date: Jun. 30, 2000, 2 pages.

* cited by examiner

*Primary Examiner*—Rajnikant B Patel
(74) *Attorney, Agent, or Firm*—Osha · Liang LLP

(57) ABSTRACT

The present invention aims to obtain a stable output voltage without requiring an extra circuit by suppressing influence of noise of the primary winding and voltage induction by leakage inductance. In a transformer 3 used in a multi-output switching power supply, a secondary winding S1 for outputting a voltage to be fed back to the primary side out of the secondary windings S2 to Sn winded on a bobbin 3a is divided into a first layer S1a and a second layer S1b, a secondary winding S2 to Sn for outputting a voltage not fed back to the primary side is winded between the first layer S1a and the second layer S1b, and the first layer S1a and the second layer S1b is regular winded.

4 Claims, 4 Drawing Sheets

TRANSFORMER, MULTI-OUTPUT SWITCHING POWER SUPPLY, LIQUID CRYSTAL TELEVISION

BACKGROUND OF THE INVENTION

1. Field of the Invention

The present invention relates to a wiring configuration of a transformer used in a multi-output switching power supply.

2. Description of the Related Art

For example, in the liquid crystal television, a multi-output switching power supply for generating a plurality of voltages according to the voltage specification of each part of the television is incorporated. Generally, the multi-output switching power supply includes a rectifying circuit for rectifying an AC voltage, a transformer which primary winding is provided with the output of the rectifying circuit and from which secondary winding a plurality of voltages are taken out, a switching element connected to the primary winding of the transformer, a feedback circuit for feeding back a predetermined voltage taken out from the secondary winding, and a switching control circuit for controlling the operation of the switching element based on the output of the feedback circuit. Examples of such multi-output switching power supply are disclosed in patent article 1 and patent article 2 to be hereinafter described.

FIG. 4 is a schematic cross sectional view showing a wiring configuration of a conventional transformer 30 used in the multi-output switching power supply. Reference character 30a is a bobbin on which the wiring is winded, and a bias winding B, primary windings P1 and P2, and secondary windings S1 to Sn are winded on the bobbin 30a. The wiring configuration of the switching power supply transformer is disclosed in patent article 3 to be hereinafter described. The switching power supply of the present article is not of a multi-output type.

Patent article 1: Japanese Laid-Open Publication No. 2003-153530

Patent article 2: Japanese Laid-Open Publication No. 10-327581

Patent article 3: Japanese Laid-Open Publication No. 2000-184714

The multi-output switching power supply has a problem in that noise is produced at the primary winding since the voltage regulation in the primary winding is large, which noise influences the secondary winding. Thus, in a case of the transformer 30 shown in FIG. 4, each voltage output from the secondary winding S1 to Sn fluctuates and variation becomes large due to noise produced at the primary windings P1, P2. Further, the voltage induction by the leakage inductance tends to occur at the wiring with large output voltage out of the secondary windings S1 to Sn since the number of windings of the coil is large, which may cause excess output due to the voltage induction.

As a countermeasure thereof, a method of arranging a circuit for suppressing noise or inductive voltage on the primary side and the secondary side of the transformer is proposed, but this increases the number of circuit components and leads to increase in cost. Although the output voltage is desirably stabilized without arranging an extra circuit, an effective solution for the above problem is not described in patent article 1 to patent article 3. Patent article 1 discloses a technique for noise measure, but increase in cost is inevitable since a semiconductor element for short circuiting the secondary side of the transformer is essential. Patent article 2 also discloses a technique for suppressing noise or ripple, but the problem of increase in cost cannot be resolved since an additional wiring is required. Patent article 3 aims to eliminate lowering in bonding degree in time of low voltage input to enhance power conversion efficiency, and does not respond to the above problem. The present article also has a feature in the wiring configuration of the primary side, but does not have a feature in the wiring configuration on the secondary side as in the present invention to be hereinafter described.

SUMMARY OF THE INVENTION

The present invention thus aims to suppress influence of noise of the primary winding and voltage induction by leakage inductance without requiring an extra circuit to obtain a stable output voltage.

The transformer according to the present invention is a transformer for multi-output switching power supply in which an output of a rectifying circuit is supplied to a primary winding, a plurality of voltages are taken out from a secondary winding, and a predetermined voltage taken out is fed back to the primary side, and the operation of a switching element connected to the primary winding is controlled based on the feed back, wherein the secondary winding for outputting a voltage to be fed back out of the secondary windings winded around a bobbin is divided into a first layer and a second layer, and a secondary winding for outputting a voltage not fed back is winded between the first layer and the second layer.

A multi-output switching power supply according to the present invention is a multi-output switching power supply comprising a rectifying circuit for rectifying an AC voltage, a transformer to which primary winding is provided with an output of the rectifying circuit and from which secondary winding a plurality of voltages supplied to each part are taken out, a switching element connected to the primary winding of the transformer, a feedback circuit for feeding back a predetermined voltage taken out from the secondary winding, and a switching control circuit for controlling the operation of the switching element based on the output of the feedback circuit; wherein a secondary winding for outputting a voltage fed back by the feedback circuit out of the secondary windings winded on a bobbin of the transformer is divided into a first layer and a second layer, a secondary winding for outputting a voltage not fed back is winded between the first layer and the second layer, and the secondary winding of the first layer and the second layer is regular winded.

The secondary winding (feedback line) for outputting the voltage fed back to the primary side is a winding that has a stable output voltage due to feedback control compared to other secondary windings and that has minimum noise out of the secondary windings. Thus, the relevant secondary winding is able to be used as a shield member. Focusing on this point in the present invention, the relevant secondary winding is divided into two layers, and other secondary windings are arranged between the layers, so that noise caused by voltage fluctuation of the primary winding superimposing the other secondary windings or voltage induction being caused by leakage inductance are suppressed by the shield effect of the secondary winding of two layers. Therefore, the noise or voltage induction on the secondary side is suppressed and a stable output voltage is obtained by simply modifying the winding method of the secondary winding of the transformer without requiring an additional circuit component. As a result of stable output voltage, a design that takes into consideration the variation of voltage is unnecessary in the peripheral circuit, and a degree of margin is increased.

In the present invention, by winding the secondary winding of the first layer and the second layer in a regular winding, a gap is not created between the windings as in the space winding, and the windings are winded in a closely attaching state, whereby the shield effect by the secondary winding is further enhanced, and the noise or voltage induction at the other secondary windings are more effectively suppressed. In particular, since voltage induction by leakage inductance is likely to occur at the secondary winding having a great number of windings (large output voltage), it is effective to shield with the secondary winding of two layers of regular winding.

The transformer and the multi-output switching power supply according to the present invention are suited to, for example, a liquid crystal television. The liquid crystal television includes a tuner, a signal processing part for processing a television signal extracted at the tuner, a liquid crystal panel for displaying a predetermined picture based on a picture signal processed in the signal processing part, a back light for illuminating the liquid crystal panel, a voice output part for outputting voice based on a voice signal processed in the signal processing part, and a power supply circuit for supplying voltage to each part; the power supply circuit including a rectifying circuit for rectifying an AC voltage, a transformer to which primary winding an output of the rectifying circuit is provided with and from which secondary winding a plurality of voltages supplied to each part is taken out, a switching element connected to the primary winding of the transformer, a feedback circuit for feeding back a predetermined voltage taken out from the secondary winding, and a switching control circuit for controlling the operation of the switching element based on the output of the feedback circuit; wherein a secondary winding for outputting a voltage fed back by the feedback circuit out of the secondary windings winded on a bobbin of the transformer is divided into a first layer and a second layer, a secondary winding for outputting a voltage not fed back is winded between the first layer and the second layer, and the secondary winding of the first layer and the second layer is regular winded.

In a case of the liquid crystal television, the voltage supplied to each part such as the tuner, the amplifier, the back light, the liquid crystal panel, the microcomputer and the like each differs, and various types of power supply voltages are generated in the power supply circuit. However, by adopting the present invention, a stable voltage can be supplied to each part of the liquid crystal television even if the type of power supply voltage is increased, thereby contributing to improving the quality.

According to the present invention, the influence of noise of the primary winding, or the voltage induction by the leakage inductance is suppressed by simply modifying the winding method of the secondary winding of the transformer, and a stable output voltage is obtained. Further, this can be realized inexpensively without increasing the cost since an extra circuit is not required.

DETAILED DESCRIPTION OF THE PREFERRED EMBODIMENTS

Figure 1:
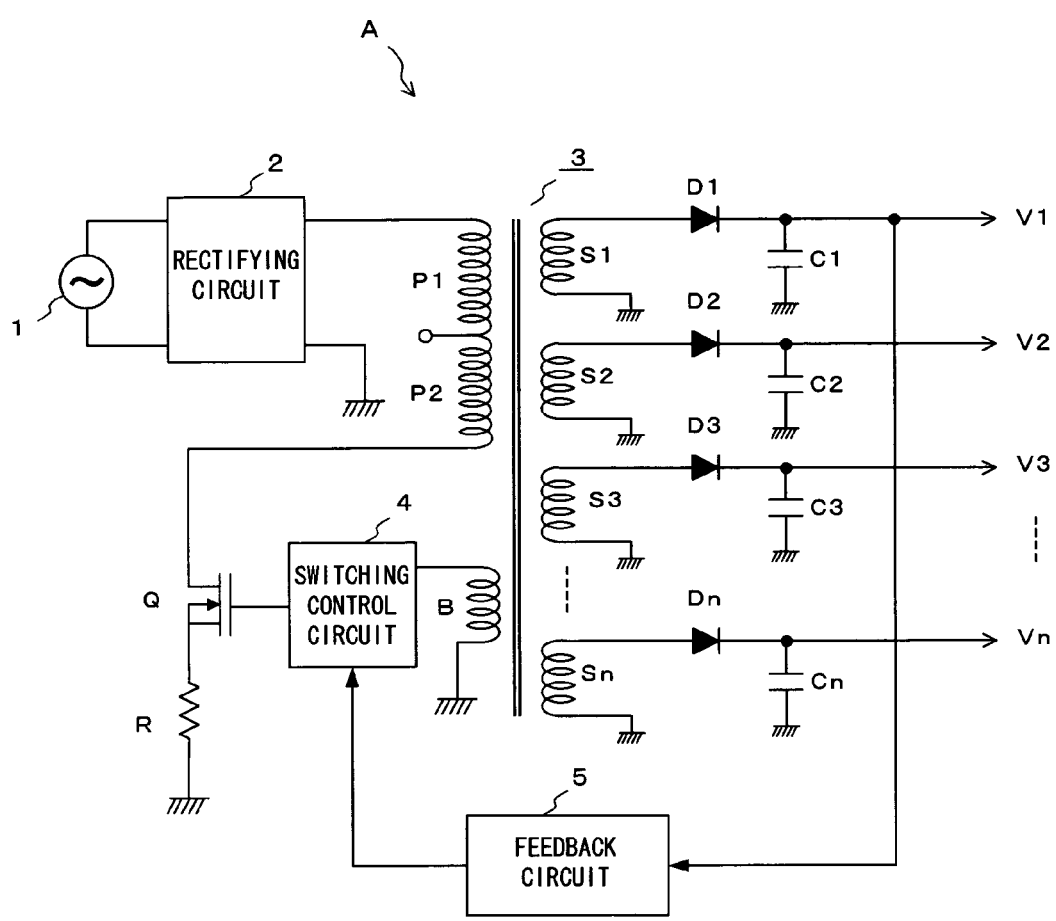
FIG. 1 is a circuit diagram showing one example of a multi-output switching power supply.

The embodiment of the present invention will now be described based on the figures. FIG. 1 is a circuit diagram showing one example of a multi-output switching power supply A. Reference character 2 is a rectifying circuit for full wave rectifying the AC voltage of the power supply 1 and reference character 3 is a transformer which primary windings P1, P2 are provided with the output of the rectifying circuit 2 and from which secondary windings S1 to Sn a plurality of voltages V1 to Vn are taken out. The rectifying diodes D1 to Dn are arranged for each secondary winding S1 to Sn on the secondary side of the transformer 3, and smoothing capacitors C1 to Cn are arranged for each secondary winding S1 to Sn. Q is a switching element connected to the primary windings P1, P2 of the transformer 3 and is made of, for example, MOS-FET. R is a resistor connected in series with the switching element Q. Reference character 4 is a switching control circuit for controlling the operation of the switching element Q, and B is a bias winding for turning ON/OFF the switching element Q by oscillation. Reference character 5 is a feedback circuit for feeding back one of the voltages taken out from the secondary windings S1 to Sn of the transformer 3, and is configured by a photocoupler and the like. The output of the feedback circuit 5 is provided to the switching control circuit 4. In the present embodiment, the output voltage V1 of the secondary winding S1 of the transformer 3 is fed back by the feedback circuit 5.

The circuit itself of the multi-output switching power supply A described above is well known, employing an RCC (Ringing Choke Converter) switching regulator. The current that flows to the primary windings P1, P2 is intermitted through the ON/OFF operation of the switching element Q by self exciting oscillation, where the energy is stored in the transformer 3 during the period in which the switching element Q is turned ON, and the stored energy is discharged to the secondary side during the period in which the switching element Q is turned OFF, so that a plurality of voltages V1 to Vn are taken out from the secondary windings S1 to Sn. The voltages V1 to Vn are supplied to each load (not shown). Since the voltage V1 is an output voltage to be fed back, when the voltage V1 fluctuates due to fluctuation of the load and the like, feedback is performed to the primary side through the feedback circuit 5, and the output voltage V1 is maintained constant by controlling the switching operation (frequency or pulse width) of the switching element Q with the switching control circuit 4.

Figure 2:
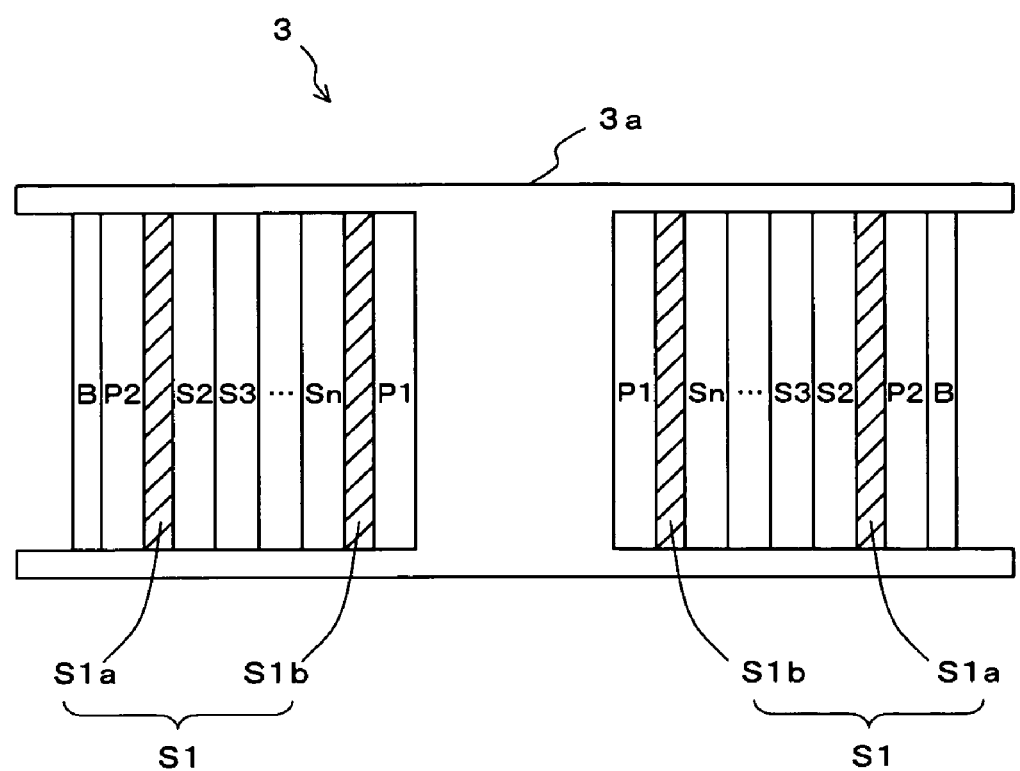
FIG. 2 is a schematic cross sectional view showing a winding configuration of a transformer according to the present invention.

FIG. 2 is a schematic cross sectional view showing a winding configuration of the transformer 3 according to the present invention. Reference character 3a is a bobbin on which the winding is winded, and the bias winding B, primary windings P1 and P2, and the secondary windings S1 to Sn shown in FIG. 1 are winded on the bobbin 3a. The secondary winding S1 that outputs the voltage V1 to be fed back out of the secondary windings S1 to Sn is divided into a first layer S1a and a second layer S1b. The layers S1a, S1b, however, configure one winding S1 as shown in FIG. 1 in terms of a circuit. Other secondary windings S2 to Sn, that is, the secondary windings that output the voltages V2 to Vn that are not fed back are winded between the first layer S1a and the second layer S1b. Both first layer S1a and second layer S1b of the secondary winding S1 are winded in a regular winding instead of in a space winding. The regular winding is a method of winding with the windings closely contacted without forming a space between the windings.

Thus, the noise or voltage induction on the secondary side of the transformer 3 is suppressed by dividing the secondary winding S1 applied with feedback into two layers and arranging the other windings S2 to Sn not applied with feedback in between. The reasons for this will be explained below.

In the transformer 3, noise is easily produced at the primary windings P1, P2 since the voltage regulation $\Delta V/\Delta t$ is large, and this noise influences the voltage of the secondary winding. However, the secondary winding S1 is less likely to be subjected to the influence of noise produced at the primary windings P1, P2 and the influence of the leakage inductance, and the voltage fluctuation is extremely small since the output voltage is stabilized by the feedback control. That is, the secondary winding S1 is the most electrically stable winding out of the secondary windings. On the contrary, the voltages of other secondary windings S2 to Sn fluctuate when subjected to the influence of noise of the primary windings P1, P2 since the feedback control is not performed. Furthermore, a problem of voltage induction by the leakage inductance arises in the secondary windings S2 to Sn, and in particular, the voltage induction easily occurs at the secondary winding having a large output voltage since the number of windings of the coil is large, and thus the output becomes an excess due to the voltage induction. According to a configuration of sandwiching the other secondary windings S2 to Sn with the first layer S1a and the second layer S1b of the secondary winding S1 as shown in FIG. 2, each layer S1a, S1b of the secondary winding S1 functions as a shield member. The noise of the primary windings P1, P2 is thus suppressed from influencing the other secondary windings S2 to Sn by the shield effect, and the voltage induction caused by the leakage inductance is suppressed, and the voltage fluctuation is reduced.

In this case, since each layer S1a, S1b of the secondary winding S1 is winded in a regular winding, a gap is not created between the windings as in the space winding, and the secondary winding S1 is winded around the bobbin 3a in a closely contact manner. Consequently, the shield effect by the secondary winding S1 is further enhanced, and the noise or voltage induction at the other secondary windings S2 to Sn is more effectively suppressed. In particular, since the voltage induction caused by the leakage inductance is likely to occur at the secondary windings having large number of windings, it is effective to shield with the secondary winding S1 of two layers of regular winding as described above.

In the embodiment, the noise or voltage induction at the secondary windings S2 to Sn not applied with feedback is suppressed, and the output voltage of small fluctuation can be taken out by devising a winding configuration of the secondary winding of the transformer 3. Therefore, a stable voltage is obtained without arranging a special circuit, and is realized inexpensively without increasing the cost. As a result of stabilizing the output voltage, a design that takes into consideration the variation of voltage also becomes unnecessary at the peripheral circuits, and thus the degree of margin increases.

Figure 3:
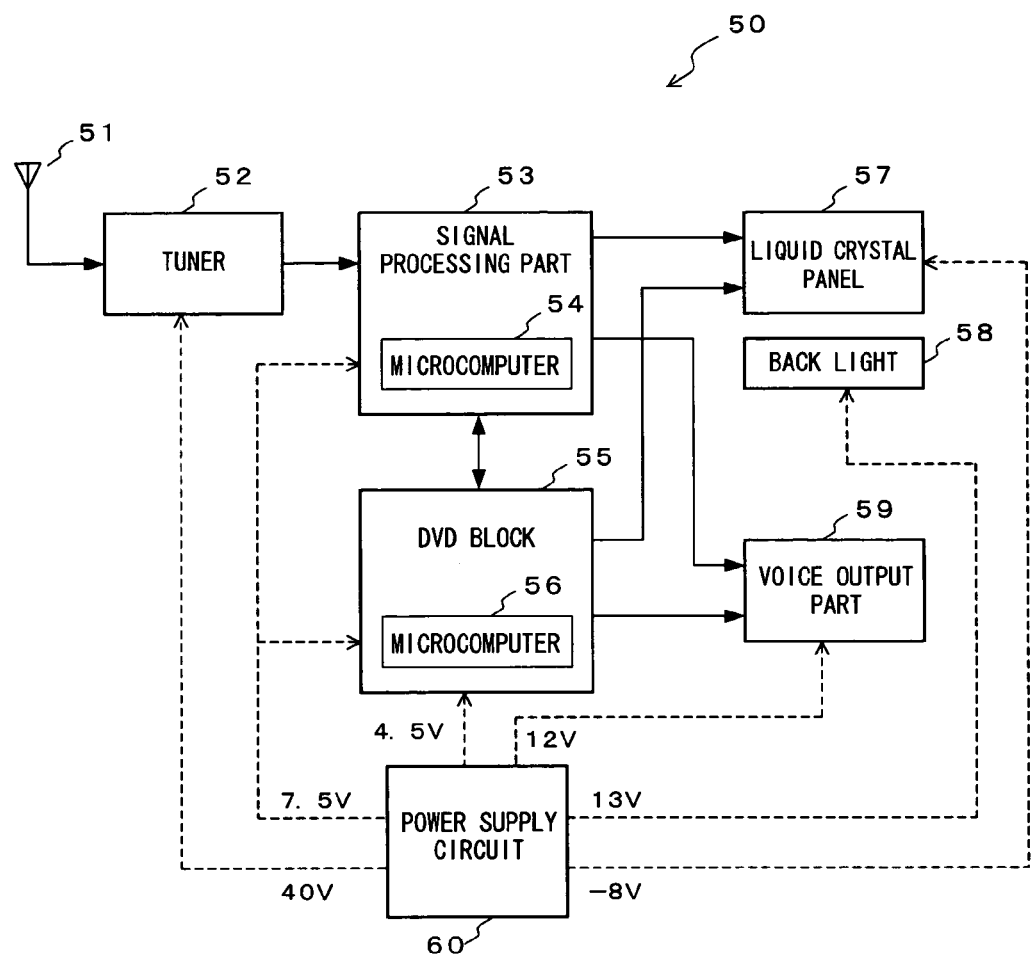
FIG. 3 is a schematic block diagram showing one example of a liquid crystal television applied with the present invention.
Figure 4:
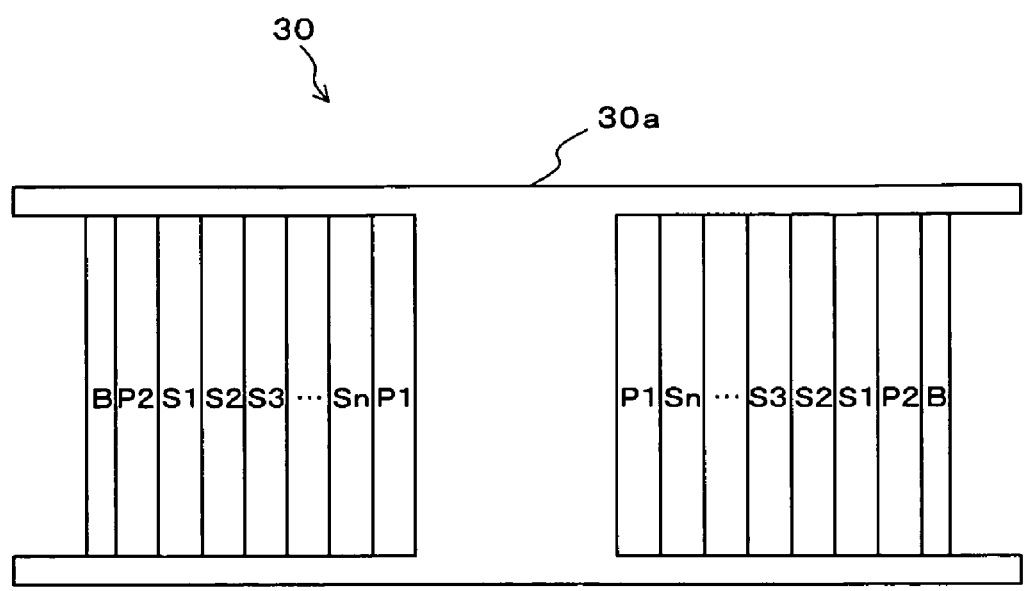
FIG. 4 is a schematic cross sectional view showing a winding configuration of a conventional transformer.

FIG. 3 is a schematic block diagram showing one example of a liquid crystal television 50 applied with the present invention. Reference character 51 is an antenna for receiving airwaves, reference character 52 is a tuner for extracting a television signal of a predetermined channel from the airwave received at the antenna 51, reference character 53 is a signal processing part for processing the television signal extracted at the tuner 52, and reference character 54 is a microcomputer arranged in the signal processing part 53. The microcomputer 54 performs various processes other than the process of the television signal, but is shown as one part of the signal processing part 53 for the sake of convenience. Reference character 55 is a DVD (Digital Versatile Disk) block incorporated in the television, and reference character 56 is a microcomputer arranged in the DVD block 55. The DVD block 55 is arranged with a disc loader for taking in and ejecting the DVD, a recordation and reproduction circuit for performing read and write of information with respect to the DVD, a signal processing circuit for processing a reproduction signal and a recordation signal, and the like (not shown). Reference character 57 is a liquid crystal panel for displaying a predetermined picture based on the picture signal processed in the signal processing part 53 and the DVD block 55, reference character 58 is a back light for illuminating the liquid crystal panel 57, and reference character 59 is a voice output part for outputting voice based on the voice signal processed in the signal processing part 53 and the DVD block 55. The voice output part 59 is configured by an amplifier, a speaker and the like. Reference character 60 is a power supply circuit for supplying voltage to each part, and includes the multi-output switching power supply A shown in FIG. 1, and uses the transformer 3 shown in FIG. 2 as the power supply transformer.

As shown with a broken line in FIG. 3, various types of power supply voltages are supplied from the power supply circuit 60 to each part of the liquid crystal television 50. The illustrated example is merely an example, where 40V is supplied to the tuner 52, 4.5V to the DVD block 55, 7.5V to the microcomputers 54 and 56, 12V to the voice output part 59, 13V to the back light 58, and −8V to the liquid crystal panel 57. Since the voltage specifications of each part are different, various types of power supply voltage are generated by the multi-output switching power supply A in the power supply circuit 60. However, by using the transformer 3 of the present invention as the power supply transformer, a stable voltage is supplied to each part of the liquid crystal television 50 even if a great number of types of power supply voltage exist, thereby contributing to improving the quality.

With regards to the example of FIG. 3, stabilization by the feedback control with respect to the power supply voltage 13V for the back light 58 is achieved due to the necessity in maintaining the brightness of the screen of the liquid crystal panel 57 constant, and the first layer S1a and the second layer S1b of FIG. 2 are configured by the secondary winding (S1 in FIG. 1) that outputs the voltage 13V. The secondary windings (S2 to Sn in FIG. 1) that output other voltages are winded between each layer S1a, S1b. Consequently, even with the secondary winding with the most number of windings that outputs the voltage of 40V, the voltage fluctuation by noise or voltage induction becomes small due to the shield effect of two layers, the variation of the drive voltage of the tuner 52 is reduced, and a stable channel selecting operation is performed.

In the above embodiment, an example in which a plurality of secondary windings S2 to Sn are winded between the first layer S1a and the second layer S1b of the secondary winding S1 has been given, but the secondary winding to be winded between the first layer S1a and the second layer S1b may be singular according to the number of voltages taken out from the secondary side of the transformer 3.

In the above embodiment, an example in which the liquid crystal television 50 incorporates the DVD block 55 is given, but the liquid crystal television 50 may not incorporate the DVD block.

Further, in the above embodiment, an example in which the transformer 3 and the multi-output switching power supply A of the present invention are used in the liquid crystal television 50 is given, but the present invention may be applied to a CRT television or plasma display television other than the liquid crystal television, and further, may be applied to various electrical equipments other than the television such as a disc recording and reproducing device, a projector and the like.

What is claimed is:

1. A liquid crystal television comprising:
    a tuner;
    a signal processing part for processing a television signal extracted at the tuner;
    a liquid crystal panel for displaying a predetermined picture based on a picture signal processed in the signal processing part;
    a back light for illuminating the liquid crystal panel;
    a voice output part for outputting voice based on a voice signal processed in the signal processing part; and
    a power supply circuit for supplying voltage to each part, the power supply circuit being a multi-output switching power supply including:
        a rectifying circuit for rectifying an AC voltage;
        a transformer to which primary winding an output of the rectifying circuit is provided with and from which secondary winding a plurality of voltages supplied to each part is taken out;
        a switching element connected to the primary winding of the transformer;
        a feedback circuit for feeding back a predetermined voltage taken out from the secondary winding; and
        a switching control circuit for controlling the operation of the switching element based on the output of the feedback circuit,
    wherein a secondary winding for outputting a voltage fed back by the feedback circuit out of the secondary windings winded on a bobbin of the transformer is divided into a first layer and a second layer, and wherein a secondary winding for outputting a voltage not fed back is arranged between the first layer and the second layer.

2. A transformer for multi-output switching power supply in which an output of a rectifying circuit is supplied to a primary winding, a plurality of voltages are taken out from a secondary winding, and a predetermined voltage taken out is fed back to the primary side, and the operation of a switching element connected to the primary winding is controlled based on the feed back,
    wherein a secondary winding for outputting a voltage to be fed back out of the secondary windings winded around a bobbin is divided into a first layer and a second layer, and wherein a secondary winding for outputting a voltage not fed back is arranged between the first layer and the second layer.

3. The transformer according to claim 2, wherein the secondary winding forming the first layer and the second layer has no gap between individual turns of the winding.

4. A multi-output switching power supply comprising:
    a rectifying circuit for rectifying an AC voltage;
    a transformer to which primary winding is provided with an output of the rectifying circuit and from which secondary winding a plurality of voltages are taken out;
    a switching element connected to the primary winding of the transformer;
    a feedback circuit for feeding back a predetermined voltage taken out from the secondary winding; and
    a switching control circuit for controlling the operation of the switching element based on the output of the feedback circuit,
    wherein a secondary winding for outputting a voltage fed back by the feedback circuit out of the secondary windings winded on a bobbin of the transformer is divided into a first layer and a second layer, and wherein a secondary winding for outputting a voltage not fed back is arranged between the first layer and the second layer.

* * * * *